June 19, 1951  V. B. GRAHAM ET AL  2,557,098
SHEARING MACHINE
Filed May 3, 1948  2 Sheets-Sheet 1

Inventors
Von B. Graham
Kenneth E. Graham

By Clarence A. O'Brien
and Harvey B. Jacobson
Attorneys

June 19, 1951  V. B. GRAHAM ET AL  2,557,098
SHEARING MACHINE
Filed May 3, 1948  2 Sheets-Sheet 2

Inventors
Von B. Graham
Kenneth E. Graham

By Clarence A. O'Brien
and Harvey B. Jackson
Attorneys

Patented June 19, 1951

2,557,098

UNITED STATES PATENT OFFICE 2,557,098

SHEARING MACHINE

Von B. Graham, Austin, Tex., and
Kenneth E. Graham, Bedford, Ind.

Application May 3, 1948, Serial No. 24,886

11 Claims. (Cl. 125—23)

This invention appertains to novel and useful improvements in shearing apparatus and is a continuation-in-part of our co-pending application, Serial No. 740,106, filed April 8, 1947, and entitled "Shearing Machine," which has matured to Patent No. 2,453,216.

An object of this invention is to supply a frame having a slide attached thereto with means engaging said slide and reacting on said frame for actuating the slide slidably on the frame and to supply a support on the slide with a tool holder pivotally received therein but limited in its travel (pivotally) and a shank pivotally associated with the tool holder with a bit pivoted thereto adapted to engage a section of stone, granite, or other types of sedimentary, igneous and metamorphic rock.

Another object of this invention is to simplify shearing apparatus in order to reduce the initial cost of the machinery yet provide an efficient and satisfactorily operative device by means of the improved tool holding apparatus.

Ancillary objects and features of novelty will become apparent to those skilled in the art, in following the description of the preferred form of the invention, illustrated in the accompanying drawings, wherein.

It is one of the primary purposes of the present invention to provide a device which is relatively inexpensive yet which will shear various types of rock constructions effectively and in a predetermined path. This is accomplished by means of a relatively inexpensive yet effective means of attachment of a cutting edge device to the slide construction whereby the cutting edges follow the contour of the rock which is being cut.

Figure 1:
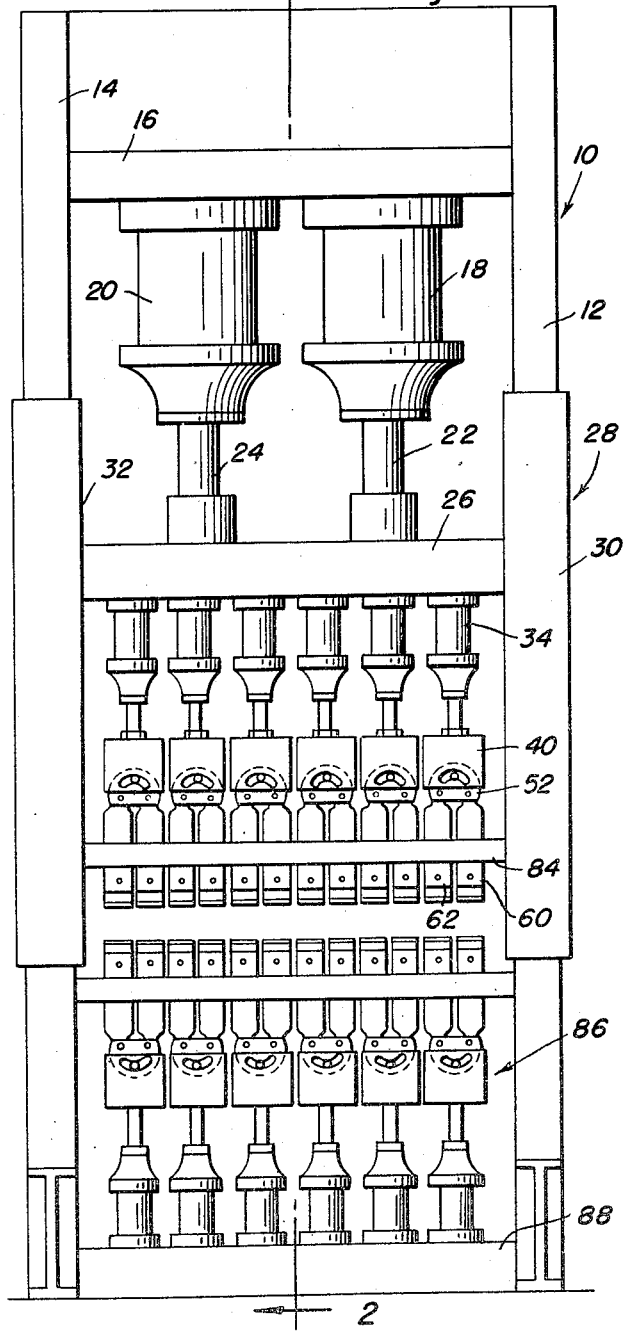
Figure 1 is an elevational front view of the preferred form of the invention.

Viewing Figure 1 it will be seen that a frame generally indicated at 10 is provided of any conventional description and preferably includes side rails 12 and 14 respectively with a header 16 extending thereacross and maintaining the side rails in spaced relation. Hydraulic cylinders 18 and 20 respectively are attached to the header 16, reacting thereon when the piston rods 22 and 24 thereof engage a slide cross member 26. The said slide cross member forms a portion of a slide generally indicated at 28 and is attached to a pair of track runners 30 and 32 respectively. These runners are slidably received on the said spaced side members or rails 12 and 14 respectively.

Attached to the undersurface of the cross member 26 is a plurality of cylinders 34 which have rods 36 extending therefrom. These rods are threaded at one end thereof and a suitable, conventional nut 38 is attached thereto. The said nut 38 bears on a support 40 and this support is provided with a threaded aperture 42 in order to accommodate the threaded portion of the rods 36.

An arcuate recess 44 is supplied in the bottom surface of said support 40 and spaced arcuate slots 46 are supplied in the sides of the supports 40. These slots accommodate a pin 48 which is maintained in place by means of a conventional washer 49 supplied at each end thereof and conventional cotter pins 50 extending through the pin 48, bearing on the washers 49, at each end of the said pin 48.

Also received on the said pin 48 is a tool holder 52 which has an upper arcuate surface complemental to the confines of the recess 44. A suitable aperture is supplied in the said tool holder 52 in order to accommodate the pin 48.

Adjacent the bottom edge of the said tool holder 52 there is supplied a pair of identical recesses 54 and 56 respectively in order to accommodate shanks 60 and 62. The said shanks have curved terminals 64 and 66 respectively which are complemental to the curved confines of the recesses 54 and 56. Pins 68 extend through suitable apertures in the tool holder 52 and the shanks 60 and 62 in order to pivotally mount the shanks within the tool holder 52.

Detachable bits 70 and 72 respectively having ground or otherwise sharpened edges 74 thereon are pivoted to each shank 60 and 62 by means of a conventional pivot pin 78. Of course the pivot pin 78 extends through suitable apertures in each of the bits 70 and 72 and suitable apertures supplied adjacent the terminal of the shanks 60 and 62. The upper surface or edge of each of the bits 70 and 72 is smoothly curved in order to conform to the smoothly curved recesses 80 and 82 respectively of the said shanks 60 and 62.

By the above described structure of the tool construction is pivoted in three successive positions starting with the pin 48, following to the pins 68, thence the pins 78. By this expedient the irregular contours of the rock are compensated for during the shearing operations thereon.

It will be noted that the tool holder 52 is limited in its travel by means of the pin 48 cooperating with the confines of the slots 46. The shanks 60 and 62 are limited in their travel by cooperation with the next adjacent shanks and the bits 70 and 72 are limited in their pivotal travel by the restriction of the recesses 80 and 82 cooperating with the upper curved surfaces of the said bits.

A tie member 84 may extend across the slide 28 adjacent the shanks, forming a portion of the said slide. Further, the lower bank of tool constructions generally indicated at 86 which are identical to the single described detail tool construction may be stationary or actuated by some suitable means such as a hydraulic mechanism, mechanical mechanism or the like. The lower bank of bits 86 may be supported on a suitable tie rod 88 forming a portion of the frame 10. Further, if it is found desirable a second slide assembly may be positioned on the frame 10 in order to accommodate a device having a movable lower bed of tool constructions to engage the undersurface of the rock to be cut by movement of the cutting edges (as well as the other pertinent mechanism).

Figure 2:
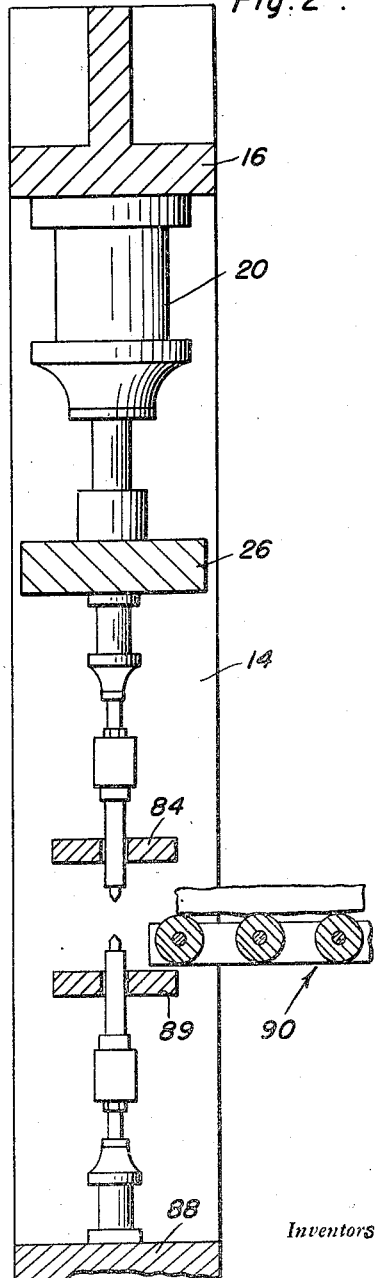
Figure 2 is a longitudinal sectional view taken substantially on the line 2—2 of Figure 1 and in the direction of the arrows.
Figure 4:
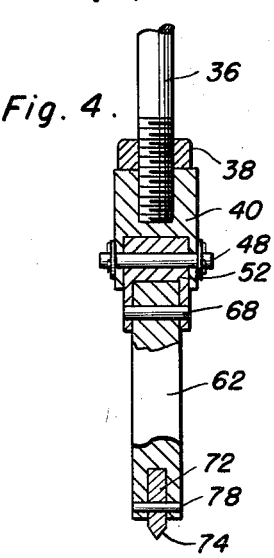
Figure 4 is a sectional view taken substantially on the line 4—4 of Figure 3 and in the direction of the arrows.
Figure 3:
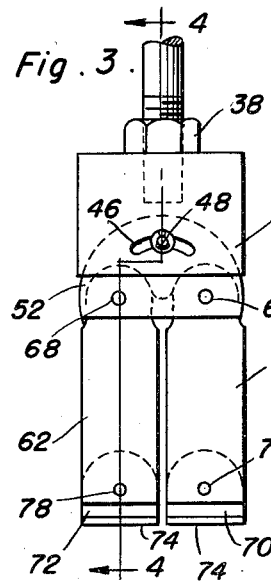
Figure 3 is an enlarged elevational detail construction illustrating the tool holder.
Figure 6:
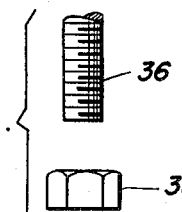
Figure 6 is an exploded elevational view showing the means for attachment of the tool holding device to the slides in the apparatus.
Figure 7:
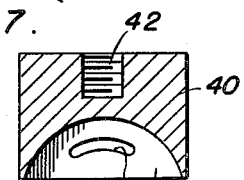
Figure 7 is a sectional view of the tool support mechanism.
Figure 8:
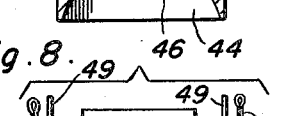
Figure 8 is an exploded view of a pin construction used in association with the tool holder and support.
Figure 9:
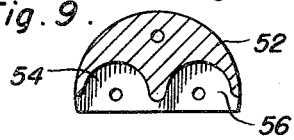
Figure 9 is a sectional view of the tool holder.
Figure 5:
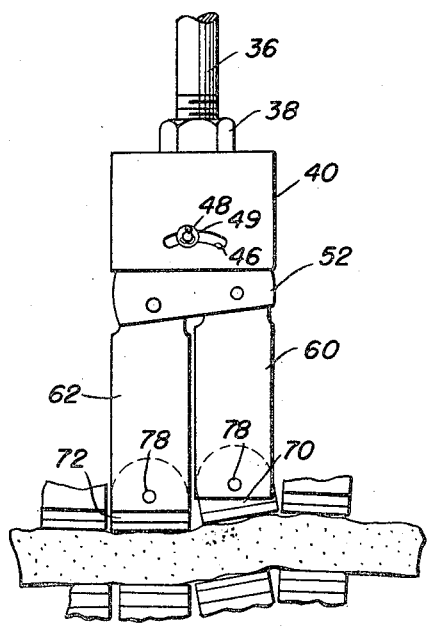
Figure 5 is an elevational view of the tool holder shown in Figure 3 showing the same in use.
Figure 10:
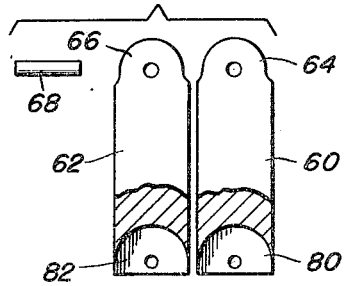
Figure 10 is an exploded elevational view showing the shank construction for use in association with the tool holder, portions being broken away in section to illustrate detail of construction.
Figure 11:
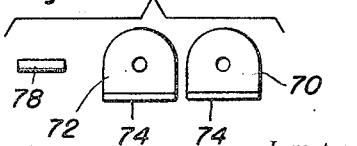
Figure 11 is an exploded elevational view showing a bit construction for use in association with the shanks.

As is seen in Figure 2 the tie member 84 and the tie member 89 in the slide and frame construction respectively have longitudinal slots in order to further guide the shanks 60 and 62 in their travel.

An endless conveyor generally indicated at 90 of conventional description may be used in association with the above described device in order to feed rock of various descriptions between the cutting edges of the bits 70 and 72 of each cutter mechanism.

While there has been described and illustrated but a preferred form of the invention, it is apparent that variations may be made without departing from the spirit thereof.

Having described the invention, what is claimed as new is:

1. A shearing apparatus including a frame having a slide attached thereto, and means for actuating said slide, at least one support attached to said slide and having a recess therein, a tool holder, means for pivotally retaining said holder in said recess, and cutting means pivoted in said holder.

2. A shearing apparatus including a frame having a slide attached thereto, and means for actuating said slide, at least one support attached to said slide and having a recess therein, a tool holder, means for pivotally retaining said holder in said recess, cutting means in said holder, and said cutting means including a shank having a bit pivotally attached to said shank.

3. A shearing apparatus including a frame having a slide attached thereto, and means for actuating said slide, at least one support attached to said slide and having a recess therein, a tool holder, means for pivotally retaining said holder in said recess, cutting means in said holder, and means in said support and said tool holder for limiting the pivotal travel of said tool holder relative to said support, said cutting means including a shank pivoted within said holder and extending therefrom, said shank having an arcuate recess at one end thereof and a bit pivotally secured within said arcuate recess.

4. In a shearing apparatus, a frame having a slide attached thereto, means engaging said slide and reacting on said frame for actuating said slide, the improvement which comprises: a support attached to said slide, a tool holder pivoted to said support, a shank pivoted to said tool holder and a bit operatively connected with said shank.

5. In a shearing apparatus, a frame having a slide attached thereto, means engaging said slide and reacting on said frame for actuating said slide, the improvement which comprises: a support attached to said slide, a tool holder pivoted to said support, a shank pivoted to said tool holder, and means for limiting the pivotal movement of said holder and pivotally attaching said holder to said support.

6. In a shearing apparatus, a frame having a slide attached thereto, means engaging said slide and reacting on said frame for actuating said slide, the improvement which comprises: a support attached to said slide, a tool holder pivoted to said support, a shank pivoted to said tool holder, means for limiting the pivotal movement of said holder and pivotally attaching said holder to said support comprising a pin extending through said holder and terminating in said support, said support having an arcuate recess and a portion of said holder being received in said arcuate recess.

7. In a shearing apparatus, a frame having a slide attached thereto, means engaging said slide and reacting on said frame for actuating said slide, the improvement which comprises: a support attached to said slide, a tool holder pivoted to said support, a shank pivoted to said tool holder, and means for limiting the pivotal movement of said holder and pivotally attaching said holder to said support, and a bit pivoted to said shank.

8. The combination of claim 6 and said shank having a curved recess with a bit pivotally secured therein.

9. A shearing machine comprising a frame having a slide attached thereto, means engaging said slide and reacting on said frame for actuating said slide, a bit, and a rod attached to said slide, means including three successively pivoted members connecting said rod and said bit for connecting said bit and rod.

10. A shearing machine comprising a frame having a slide attached thereto, means engaging said slide and reacting on said frame for actuating said slide, a bit, and a rod attached to said slide, means including three successively pivoted members connecting said rod and said bit for connecting said bit and rod, said bit and rod connecting means including a support, a tool holder pivoted to said support and a shank pivoted to said tool holder.

11. A shearing machine comprising a frame having a slide attached thereto, means engaging said slide and reacting on said frame for actuating said slide, a bit, and a rod attached to said slide, means including three successively pivoted members connecting said rod and said bit for connecting said bit and rod, said bit and rod connecting means including a support, a tool holder pivoted to said support and a shank pivoted to said tool holder, said tool holder and support having means operatively connected therewith for pivoting the tool holder to the support and for restricting the pivotal travel of said tool holder relative to said support.

VON B. GRAHAM.
KENNETH E. GRAHAM.

REFERENCES CITED

The following references are of record in the file of this patent:

UNITED STATES PATENTS

| Number | Name | Date |
|---|---|---|
| 749,937 | Lanigan | Jan. 19, 1904 |
| 1,919,801 | Newsom | July 25, 1933 |
| 2,152,193 | Johanning | Mar. 28, 1939 |
| 2,188,318 | Siderits | Jan. 30, 1940 |
| 2,205,313 | Stahl | June 18, 1940 |
| 2,426,344 | Dickenson | Aug. 26, 1947 |